United States Patent [19]

Kang et al.

[11] Patent Number: 5,170,096
[45] Date of Patent: Dec. 8, 1992

[54] DEGAUSSING CIRCUIT USING A RELAY

[75] Inventors: Byung-Kyu Kang; Ju-Hyun Choe, both of Suwon, Rep. of Korea

[73] Assignee: SamSung Electronics Co., Ltd., Suwon, Rep. of Korea

[21] Appl. No.: 378,778

[22] Filed: Jul. 12, 1989

[51] Int. Cl.[5] .............................................. H04N 9/29
[52] U.S. Cl. ........................................ 315/8; 361/150
[58] Field of Search ............................ 315/8; 361/150

[56] References Cited

U.S. PATENT DOCUMENTS

| | | | |
|---|---|---|---|
| 3,387,172 | 6/1968 | Simon | 315/8 |
| 3,798,493 | 3/1974 | Manske | 361/150 |
| 4,262,232 | 4/1981 | Willis | 315/8 |
| 4,295,078 | 10/1981 | Wilmarth | 315/8 |
| 4,441,052 | 4/1984 | Willis | 315/8 |
| 4,737,881 | 4/1988 | Haferl | 361/150 |
| 4,742,270 | 5/1988 | Fernsler et al. | 315/8 |
| 4,760,489 | 7/1988 | Truskalo | 315/8 |
| 4,829,214 | 5/1989 | Lendaro | 315/8 |

FOREIGN PATENT DOCUMENTS 0026982 2/1982 Japan ........................... 315/8

Primary Examiner—Eugene R. LaRoche
Assistant Examiner—Son Dinh
Attorney, Agent, or Firm—Robert E. Bushnell

[57] ABSTRACT

The invention provides a degaussing circuit using a relay having the circuit for the TV of a remote controller type including the standby-power taking-out device to drive a MICOM, the degaussing device using the applied ac power and the drive-power taking-out device to drive a TV, the device including; a control device to control said degaussing device, the drive-power taking-out device, and the standby-power taking-out device through the relay and to drive the TV, located among the output stage of the standby-power taking-out device, the input stage of the degaussing device, and the input stage of the drive-power taking out device. Obtaining the cleaner screen may be attained according to the present invention.

8 Claims, 1 Drawing Sheet

5,170,096

DEGAUSSING CIRCUIT USING A RELAY

BACKGROUND OF THE INVENTION

The present invention relates to a degaussing circuit using a relay for controlling the degaussing of a cathode ray tube (CRT).

Generally, the degaussing is to remove the magnetic field of the CRT due to the terrestrial magnetism by passing the ac power through an element coil.

In the past, for degaussing, the positive resistor (so called 'posistor') of which a resistance is increased as a temperature raises, is connected in series with the element coil, and the ac power through the element coil is cut off by the temperature increment effect after the suitable degaussing operation, but the resistance of the posistor can't become infinity after degaussing so that the microscopic degaussing is continuously carried out by the leakage current during the normal operation of a set, thereby deteriorating the screen quality.

SUMMARY OF THE INVENTION

The present invention has been made in consideration of this and has for its object to provide a degaussing circuit which can remove the unnecessary degaussing effect by cutting the current of the element coil off using a relay when the power switch is ON.

According to the present invention, there is provided a degaussing circuit using a relay having the circuit for the TV of a remote controller type including the standby-power taking-out device to drive a MICOM by taking out the standby power, the degaussing device using the applied ac power and the drive-power taking-out device to drive the TV, the device including a control device to control the degaussing device, the drive-power taking out device, and the standby-power taking-out device through the relay and to drive the TV, located among the output stage of the standby-power taking-out device, the input stage of the degaussing device, and the input stage of the drive-power taking-out device.

BRIEF DESCRIPTION OF THE DRAWING

Figure is a circuit diagram of the present invention.

DETAILED DESCRIPTION OF THE INVENTION

Figure 1:
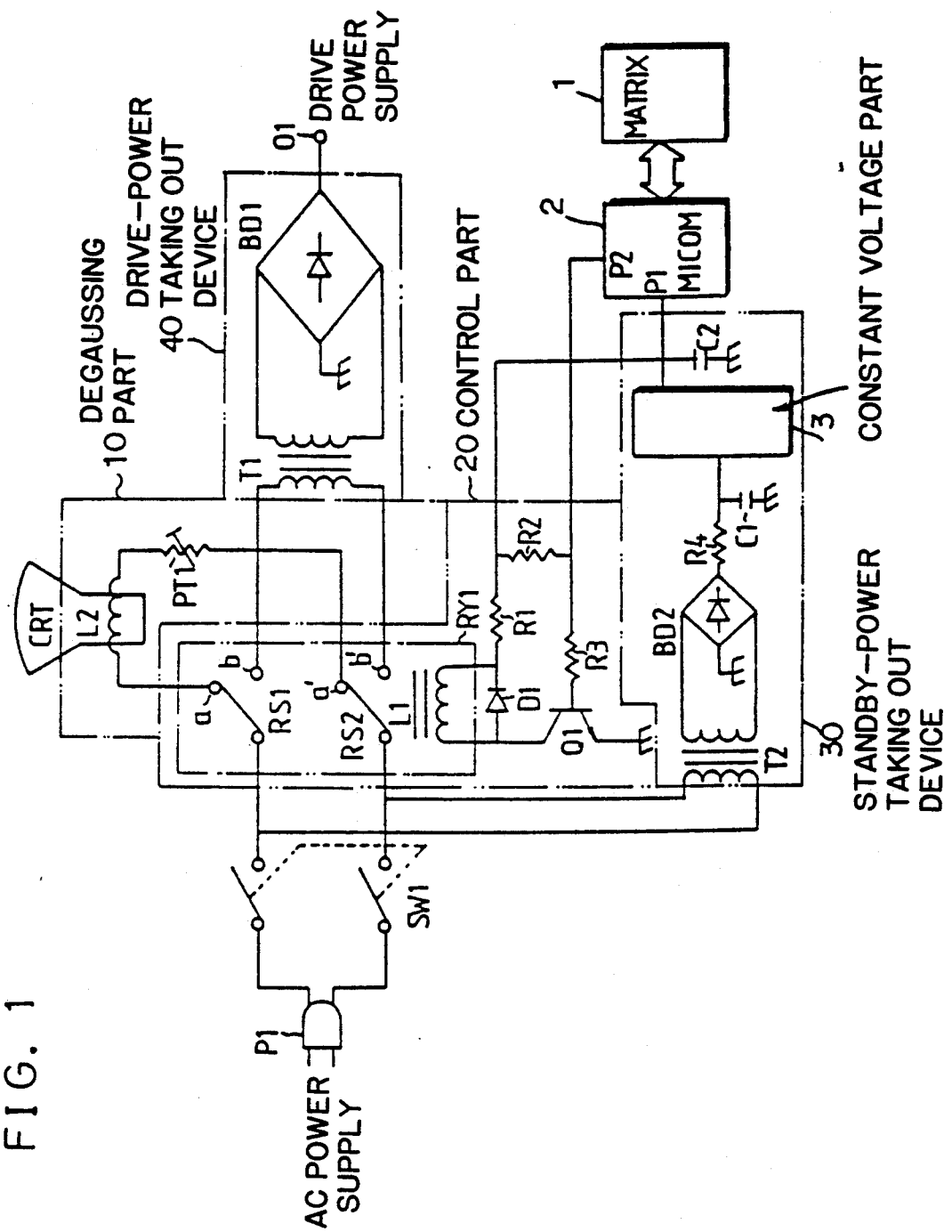

The present invention will now be described in more detail with reference to accompanying drawing.

The degaussing part 10 consists as follows, where the applied ac power through a plug P1 and a master switch SW1, can degauss the CRT through the relay switches RS1, RS2 and the element coil L2, and the standby-power taking out device 30 consists as follows, where the induced ac power to a transformer T2 through the plug P1 and the master switch SW1 is converted to dc power by a rectifying bridge diode BD2, a resistor R4, and a smoothing condensor C1, and the standby-power is taken out through the constant voltage part 3 and a smoothing condensor C2, thereby driving the MICOM, and the drive-power taking out device which consists as follows, where the applied ac power through the plug P1 and the master switch SW1 is induced to the transformer T1 and it provides the drive-power through the bridge diode BD1, thereby driving the TV through the output terminal 01, and the control part 20 consists as follows, where the outputs of the standby-power and drive-power taking device control the relay RY1 consisting of the relay coil L1 and relay switches RS1 and RS2 through the bias resistors R1-R3 and the transistor Q1 connected to a diode D1 for the direction control, thereby controlling the degaussing part 10 and the drive-power taking out device 40.

Also, the symbol 1 represents the matrix for transferring the state of a TV key (not shown in the figure) to the MICOM 2.

To describe the operation of the present invention in detail, the master switch SW1 is ON, then the applied ac power to the secondary coil of the transformer T2 through the plug P1 and the master switch SW1 is converted to dc power by the bridge diode BD2, the resistor R4 and the smoothing condensor C1 and it provides the standby-power to the MICOM 2 through the constant voltage part 3.

Where, in the initial state, the output of the MICOM 2 is L-level since the power switch (not shown in the figure) is OFF, the L-level output of the MICOM 2 turns the transistor Q1 off, and the magnetizing current does not flow through the relay coil L1, thereby converting the relay switches RS1 and RS2 to a and a' terminals, respectively.

Thus, the applied ac power through the master switch SW1 and the relay switches RS1 and RS2 flows through the CRT, the element coil L2, and the posistor PT1 so that the magnetic field of the CRT can be removed.

At this time, the ac power is not applied to the primary coil of the transformer T1 since the relay switches RS1 and RS2 are connected to a and a' terminals so that the drive-power can't be provided and the TV operation not carried out.

That is, when the power switch is OFF, the only degaussing operation of the CRT can be carried out, while the TV-drive is cut off.

But, when the power switch becomes ON, the output of the MICOM 2, H-level, turns the transistor Q1 on through the resistor R3, so the standby-power magnetizes the relay coil L1 through the resistor R1, thereby converting the relay switches RS1 and RS2 to b and b' terminals.

Thus, the applied ac power through the master switch SW1 and the relay switches RS1 and RS2 is induced to the secondary coil of the transformer T1, and it provides the drive-power for the TV through the bridge diode BD1, carrying out the TV-drive.

At this time, the ac power applied to the element coil L2 is cut off since the relay switches RS1 and RS2 are connected to b and b' terminals so that the unnecessary degaussing operation caused by the posistor PT1 can be removed when the TV is driven.

Thus, before the power switch is ON, the degaussing operation of the CRT can be carried out by the applied ac power, while the power switch becomes ON, then the degaussing operation is automatically stopped so that the screen distortion phenomenon due to the small leakage current of the posistor PT1 can be prevented, also the present invention can be utilized to the color TV or various monitors.

As mentioned above, the present invention in which the output of the MICOM for the drive of the remote controller (or, remocon), controls the degaussing operation through the relay, can obtain the cleaner screen.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A degaussing circuit for a television, comprising:
   a degaussing part for degaussing a cathode ray tube;
   a power supply;
   master switch means;
   a microcomputer;
   standby-power means for converting supplied alternating current power from the power supply to direct current power to drive the microcomputer, comprising:
   a transformer connected to the master switch;
   a first rectifying bridge diode to convert alternating current power supplied through the transformer to direct current power; and
   a constant voltage part to receive standby-power from said first rectifying bridge diode;
   drive-power means to drive the television, comprising:
   a second bridge diode; and
   a transformer to provide drive power to the television through said second bridge diode;
   control means for controlling the operation of said degaussing part and drive-power means, said control means comprising:
   a relay, driven by said microcomputer and standby-power taking out means, consisting of a relay coil and relay switch connected to a diode; and
   bias resistors and a transistor controlling the operation of said relay.

2. A method for degaussing a cathode ray tube, comprising the steps of:
   providing alternating current power to relay switches;
   removing a magnetic field within a cathode ray tube by allowing the alternating current power to flow through the relay switches to the cathode ray tube;
   converting the alternating current power to direct current power for supplying a high level voltage to a transistor, and causing the relay switches to change positions;
   supplying the alternating current power, through the relay switches, to a television, and driving the television; and
   cutting off supply of power to the cathode ray tube, halting removal of the magnetic field, and preventing screen distortion during driving of the television.

3. A degaussing system, comprising:
   a power supply;
   a degaussing circuit;
   master switch means for connecting the power supply to the degaussing circuit;
   wherein said degaussing circuit comprises;
   control means for removing current flow from a degaussing element coil when power is delivered to a drive-power means,
   relay means activated by said control means to connect the degaussing element coil to the power supply when no power is delivered to the drive-power means and disconnect said degaussing element coil from the power supply upon delivery of power to the drive-power means, and for connecting said degaussing element coil to the power supply upon disconnection of the power supply from the drive-power means via the relay means;
   microcomputer means for signalling said control means to activate said relay means based on a received signal;
   standby-power means for converting alternating current power supplied from the power supply to direct current power to the microcomputer, said standby-power means comprising:
   a transformer connected to the master switch means,
   a first rectifying diode bridge to rectify alternating current supply through the transformer to produce direct current;
   a constant voltage stage to receive standby power from said first rectifying diode bridge; and
   drive power means for driving a television upon connection to the power supply.

4. A system as claimed in claim 3, wherein said control means comprises a relay coil driven by said microcomputer and said standby-power means activates said relay coil, allowing said relay means to control the current to said degaussing element coil inducing removal, from the degaussing element coil, of current flow when power is supplied to the drive power means to allow driving of a television.

5. A degaussing system; comprising:
   a power supply;
   a degaussing circuit;
   master switch means for connecting the power supply to the degaussing circuit, wherein said degaussing circuit comprising:
   control means for removing current flow to a degaussing element coil when power is delivered to drive-power means;
   relay means activated by said control means for connecting the degaussing element coil to the power supply when no power is delivered to the drive-power means and disconnecting said degaussing element coil from the power supply upon delivery of power to the drive-power means, and for connecting said degaussing element coil to the power supply upon disconnection of the power supply from the drive-power means via said relay means;
   microcomputer for signalling said control means to activate said relay means based on a received signal; standby-power means for converting alternating current power supplied from the power supply to direct current power to the microcomputer;
   drive-power means for driving a television upon connection of the power supply to the drive-power means, said drive-power means comprising:
   a diode bridge; and
   a transformer, coupled to receive power from the power supply, for providing drive power to the television through the diode bridge.

6. A degaussing system; comprising:
   switch means for allowing and disrupting the flow of power to a degassing circuit;
   means for degaussing a cathode ray tube when power is not allowed to flow to a drive-power means through said switch means;
   control means, comprising a relay, for disconnecting said means for degaussing from a power supply, when power is allowed to flow to the drive-power means through the switch means, to cease a degaussing operation and prevent screen distortion due to leakage current;
a microcomputer for signalling said control means to disconnect said degaussing means, through use of said relay to apply power to the drive-power means;
standby-power means for converting alternating current power supplied from a power supply to direct current power to the microcomputer, said standby-power means comprising:
a transformer connected to a master switch;
a first rectifying diode bridge to rectify alternating current supplied through the transformer to direct current; and
a constant voltage stage to receive standby power from said rectifying diode bridge.

7. A degaussing circuit as claimed in claim 6, further comprising drive-power means for driving a television upon connection of the power supply to the circuit, said drive-power means comprising:
a second bridge diode; and
a transformer, coupled to receive power from the power supply, for providing drive power to the television through the second bridge diode.

8. A degaussing system, comprising:
a power supply;
a degaussing circuit;
a master switch means for connecting the power supply to the degaussing circuit;
wherein said degaussing circuit comprises:
control means for removing current flow to an element coil when power is delivered to drive-power means and preventing leakage current upon delivering of power to the drive-power means;
means for degaussing a cathode ray tube upon disconnection of the power supply from the drive-power means via said relay means;
a microcomputer for signalling said control means to activate said relay means based on a received signal;
standby-power means having a transformer connected to the master switch, a first rectifying diode bridge to rectify alternating current supplied through the transformer to direct current and a constant voltage to receive standby-power from said first rectifying diode bridge; and
drive-power means for driving a television, said drive-power means having a second diode bridge and a transformer coupled to receive power from the power supply for providing drive power to the television through the second diode bridge.

* * * * *